United States Patent
Kurokawa et al.

(10) Patent No.: US 6,953,406 B2
(45) Date of Patent: Oct. 11, 2005

(54) RATCHET TENSIONER HAVING PLUNGER STOP

(75) Inventors: Yoshio Kurokawa, Osaka (JP); Toyonaga Saitoh, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 186 days.

(21) Appl. No.: 10/610,179

(22) Filed: Jun. 30, 2003

(65) Prior Publication Data

US 2004/0007200 A1 Jan. 15, 2004

(30) Foreign Application Priority Data

Jul. 12, 2002 (JP) ........................................ 2002-204069

(51) Int. Cl.⁷ ................................................ F16H 7/08
(52) U.S. Cl. ..................................... 474/109; 474/110
(58) Field of Search ..................... 474/109–111, 101, 474/140

(56) References Cited

U.S. PATENT DOCUMENTS

| 3,626,776 | A | | 12/1971 | Staudinger et al. | |
|---|---|---|---|---|---|
| 6,120,402 | A | * | 9/2000 | Preston et al. | 474/109 |
| 6,454,672 | B2 | * | 9/2002 | Kurohata | 474/111 |
| 6,547,684 | B2 | * | 4/2003 | Kurohata | 474/111 |
| 6,767,302 | B2 | * | 7/2004 | Seungpyo | 474/109 |
| 2002/0006840 | A1 | | 1/2002 | Kurohata | |
| 2002/0019282 | A1 | * | 2/2002 | Namie et al. | 474/109 |

FOREIGN PATENT DOCUMENTS

| JP | 06-94089 | * | 4/1994 | ................. | 474/110 |
|---|---|---|---|---|---|
| JP | 06-174019 A | * | 6/1994 | ................. | 474/111 |
| JP | 8-121557 | | 5/1996 | | |
| JP | 3226037 | | 8/2001 | | |

* cited by examiner

Primary Examiner—Marcus Charles
(74) Attorney, Agent, or Firm—Howson and Howson

(57) ABSTRACT

A plunger stop for temporarily holding the plunger of a ratchet type chain tensioner in place during installation of the tensioner, or during mounting or removal of the chain, comprises a bifurcated part inserted into a groove in which a pivoted ratchet pawl is situated. The bifurcated part is sandwiched between the pivoted ratchet pawl and a part of the tensioner housing, with the bifurcated part straddling a ratchet pawl-biasing spring in the groove. A grip, which is integral with the bifurcated part protrudes outside the tensioner housing so that it can be grasped manually for removal.

3 Claims, 6 Drawing Sheets

RATCHET TENSIONER HAVING PLUNGER STOP

FIELD OF THE INVENTION

This invention relates to ratchet type tensioners of the type used to impart proper tension to a timing belt, a timing chain or the like in a vehicle engine. The invention relates more specifically to a plunger stop for temporarily preventing the protrusion of a plunger in a ratchet type tensioner.

BACKGROUND OF THE INVENTION

A ratchet tensioner, also sometimes referred to as a "ratchet-type tensioner," is used for suppressing vibration generated during the travel of an endless, flexible transmission medium, such as a timing belt or timing chain, which transmits rotation from the crankshaft to a camshaft of an engine, and for maintaining proper tension in the transmission medium. The tensioner mechanism typically includes a tensioner lever pivotally supported on the engine. A plunger, protruding from a housing of the tensioner, presses the back of the pivoted tensioner lever, near an end thereof remote from its pivot axis, thereby holding a shoe surface of the tensioner lever in sliding contact with the slack or return side of the transmission medium to impart tension.

A conventional ratchet type tensioner 31, as shown in FIGS. 8 to 12, includes a plunger 33 provided in a housing 32. The plunger protrudes retractably from a front surface of the housing, being biased in the protruding direction by a plunger spring 36. A ratchet pawl 34, pivotally supported in the housing 32 on a shaft 34A, is biased by a spring 38, as disclosed in Japanese Patent No. 3226037 (see page 2, FIGS. 5 to 10).

In the ratchet type tensioner 31, retraction of the plunger 33 is blocked by the engagement of pawl teeth 34B, formed on the pawl 34, with ratchet teeth 33B, formed on a side surface of the plunger 33.

The tensioner 31 includes an external plate 37 fixed to an end of a shaft 34A, which protrudes outside the housing 32. The shaft is also fixed to the ratchet pawl 34. When the tensioner 31 is shipped, or is being mounted on an engine block, a stop pin 39, as shown in FIG. 10, is inserted into a pin-insertion hole 37A in the plate 37, and at the same time the stop pin 39 is in abutting relationship with an outer wall surface 32A at an end of the housing 32, or alternatively the stop pin 39 may engage a stop hole 32B formed in a side wall of the housing as shown in FIGS. 11 and 12. In both cases, the pawl teeth 34B are maintained in engagement with the ratchet teeth 33B of the plunger 33, so that the plunger is held against protruding movement. After the tensioner is mounted on an engine block, the stop pin 39 may be released so that the tensioner 31 can operate normally.

To produce the conventional ratchet type tensioner 31, it was necessary to connect the external plate 37 to the shaft 34A, and, in the case of the embodiment shown in FIGS. 11 and 12, it was also necessary to drill a hole 32B for insertion of the stop pin 39 into the housing 32. These steps resulted in increased production costs.

Another problem arose where there was a only a small clearance between the tensioner housing 32 and adjacent parts of the engine block. In this case, mounting of the tensioner on the engine block, and the mounting and demounting of a chain, could not be performed easily because of interference between the stop pin 39 and the engine block.

Accordingly, the objects of the invention are to solve the above described problems encountered in the manufacture and installation of conventional ratchet-type tensioners; to provide a plunger stop for a ratchet type tensioner which can be more easily mounted of the tensioner on an engine block; to provide for easy mounting and demounting of the chain; and to reduce the difficulty and cost of production of the tensioner.

SUMMARY OF THE INVENTION

The ratchet type tensioner in accordance with the invention comprises a housing mountable on an engine block, a plunger protruding from the housing, a first spring biasing the plunger in the protruding direction, ratchet teeth on the plunger, a groove in the housing, a toothed ratchet pawl pivotally disposed in the groove, and a second spring biasing the pawl so that the teeth of the pawl are engaged with the ratchet teeth on the plunger. The improvement comprises a stop having a bifurcated part disposed in the groove of the housing, straddling the pawl-biasing second spring, and sandwiched between the pawl and a part of the housing. The stop maintains the teeth of the pawl in engagement with the ratchet teeth of the plunger, and thereby temporarily prevents movement of the plunger in the protruding direction from the housing under the biasing force applied to the plunger by the plunger-biasing first spring. The stop has a grip connected to the bifurcated part and preferably unitary with the bifurcated part. The grip extends from the bifurcated part to a location outside of the groove, to enable manual removal of the bifurcated part from the groove.

In a preferred embodiment of the invention, the groove has a pair of opposed walls, and the bifurcated part of the stop comprised a pair of elements having outer, wall-engaging surfaces, engaged with respective ones of the opposed walls of the groove. The distance between the wall-engaging surfaces of the bifurcated part, when the bifurcated part is removed from the groove, is greater than the distance between the opposed walls of the groove. Accordingly, the bifurcated part is held in the groove at least in part by friction resulting from a resilient force exerted by the elements of the bifurcated part against the walls of the groove.

The bifurcated stop is manually inserted into the housing while the plunger is held in a retracted condition, and sandwiched between the ratchet pawl and a bottom wall of the groove in which the pawl is located. The elements of the bifurcated part straddle the spring in a groove of the housing. The stop prevents pivoting movement of the pawl, and forcibly maintains engagement between the pawl and the ratchet teeth on the plunger so that it completely prevents protruding movement of the plunger.

The plunger is released for normal operation after the tensioner is installed on the engine block and the chain or other transmission medium is in place and in engagement with a tensioner lever operated by the plunger. To release the plunger, the grip is pulled manually to remove the bifurcated part from the groove of the housing, freeing the plunger for movement in the protruding direction.

In inserting the plunger, if the distance between the outermost sides of the bifurcated part of the stop is slightly larger than the width of the groove into which the stop is inserted, the elements of the bifurcated part are pressed toward each other as they are inserted into the groove. Even if the spring-biased plunger is pushed in the retracting direction, so that the sandwiching force is released, the resilient force exerted on the walls of the grooves by the elements of the bifurcated part of the stop prevents the stop from dropping out of the housing.

DETAILED DESCRIPTION OF THE PREFERRED EMBODIMENTS

Embodiments of the invention will now be described with reference to FIGS. 1 to 7.

Figure 1:
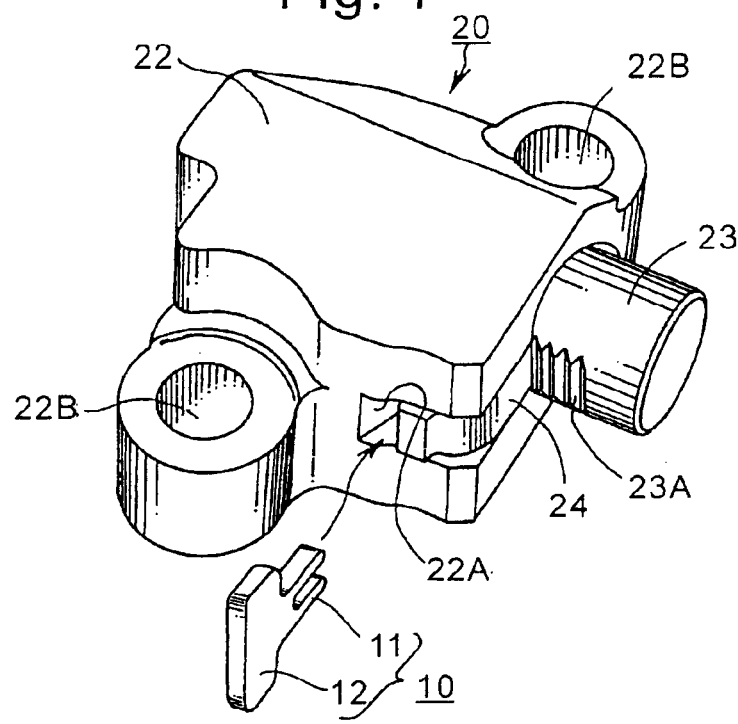
FIG. 1 is an exploded perspective view of a tensioner in accordance with the invention, showing how the plunger stop is inserted.
Figure 2:
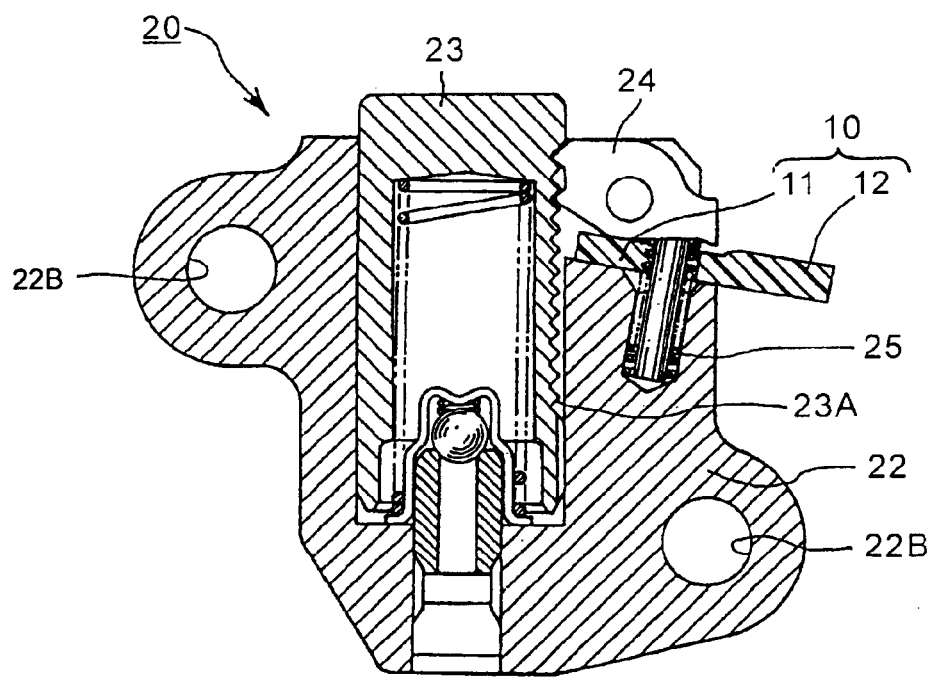
FIG. 2 is a sectional view of the tensioner, showing the plunger stop in its operative position.

As shown in FIGS. 1 and 2, a tensioner 20, to which a plunger stop 10 according to the invention is applied as a temporary stopping means, comprises a plunger 23, which is spring-biased in the protruding direction from a housing 22. The housing 22 is mounted on a vehicle engine block (not shown). A ratchet pawl 24 is disposed in a slot 22A formed in the housing 22, the slot being opened toward the plunger 23. The pawl 24 is pivoted in the housing, and biased by a spring 25 so that its teeth are engaged with ratchet teeth 23A on the outer peripheral surface of the plunger 23. The tensioner imparts proper tension to a timing belt, a timing chain, or other flexible transmission medium, in a vehicle engine.

Mounting holes 22B in FIGS. 1 and 2 are provided for mounting the housing 22 on an engine. The tensioner 20 has the same basic function as the above-described conventional ratchet type tensioner 31.

The plunger stop 10 is used for temporarily preventing protrusion of the plunger 23. It is formed with a bifurcated part 11, which is inserted between a part of the housing 22 and the ratchet pawl 24 so as to be sandwiched therebetween, with the bifurcated part 11 straddling the ratchet pawl spring 25 in the groove 22. The bifurcated part 11 of the plunger stop 10 is formed as a unit with, and projects from, a grip 12, which protrudes outside the housing 22 as shown in FIG. 2. The plunger stop 10 may be made from a variety of materials. However, it is preferably molded from a synthetic resin such as a polyamide resin, a polyacetal resin, or the like. Such resins are preferred because of considerations such as ease of molding and low molding cost.

To stop the protrusion of the plunger 23 in the tensioner 20, with the grip 12 held manually, the bifurcated part 11, which extends from the grip 12, is inserted between a part of the housing 22 and the ratchet pawl 25 so as to be sandwiched therebetween, with the bifurcated part 11 straddling the ratchet pawl spring 25 in groove 22A of the housing 22. The bifurcated part 11 prevents pivoting movement of the plunger, and thereby forcibly maintains the engagement between the ratchet pawl teeth and ratchet teeth 23A of the plunger. Therefore, even though the plunger 23 is spring biased in the direction to protrude from housing 22, the plunger stop 10 can completely stop the protrusion of the plunger 23. To release the pawl so that it can operate normally in cooperation with the plunger 23, the grip 12 is pulled manually to remove the stop 10 from the groove 22A of the housing 22, so that the plunger 23 is free to move in the protruding direction under the force applied by the plunger biasing spring.

Figure 3:
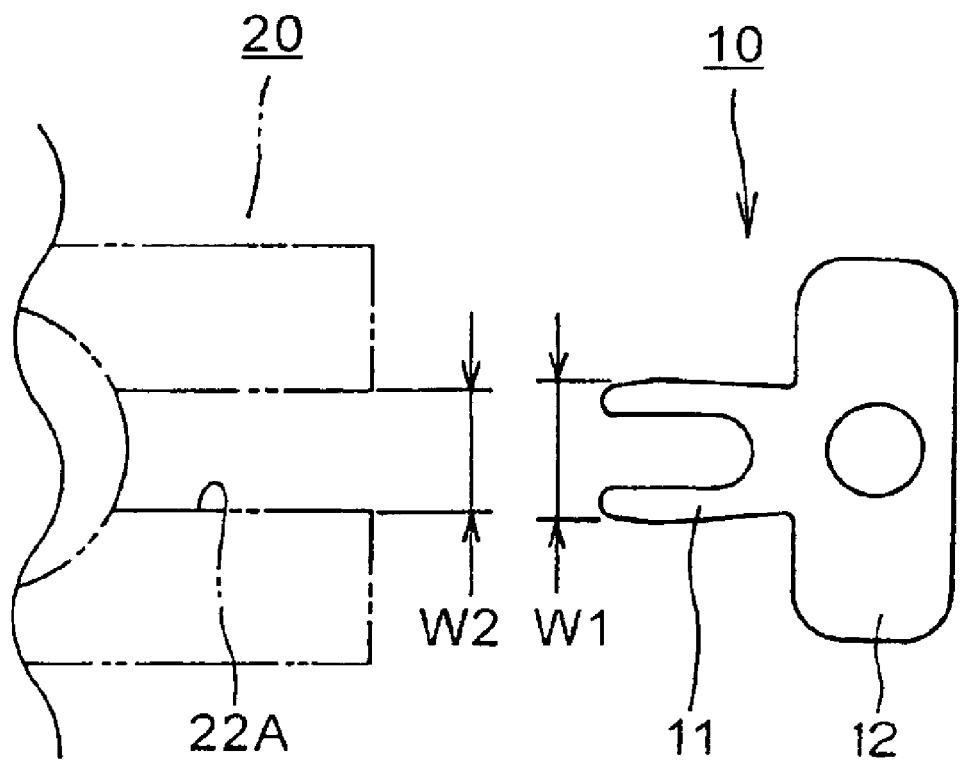
FIG. 3 is a schematic view illustrating the relationship between the distance between the bifurcated outermost sides of a stop member according to the invention and the width of the slot into which it is inserted.

The broken lines in FIG. 3 show the outline of the groove 22A in the housing 22. As shown in FIG. 3, the distance $W_1$ between the outermost sides of the bifurcated part 11 is slightly larger than the width $W_2$ of the groove 22A. Accordingly, when the stop is inserted in the groove, between the housing 22 and the pawl 24, the two elements of the bifurcated part 11 are pressed toward each other so that the distance $W_1$ is narrowed. Thus, even if the spring-biased plunger is pushed back, so that the sandwiching force, holding the bifurcated part 11 between the housing 22 and the pawl 24, is released, the compressive force acting widthwise on the inserted prevents inadvertent dropping out of the bifurcated part 11.

The distance between the innermost sides of the elements of bifurcated part 11 should be slightly larger than the outer diameter of the ratchet pawl spring 25 so that, when the bifurcated part 11 is inserted into the groove 22A, it can straddle the ratchet pawl spring 25, even though the two elements of the bifurcated part are moved slightly toward each other.

The plunger stop 10 in accordance with the invention can temporarily prevent protrusion of the plunger 23, and the tensioner utilizing the plunger stop can be produced without the need to provide an external plate, and without the step of attaching the external plate to the pivot shaft of the pawl. Moreover, there is no need to drill a special hole in the tensioner housing for receiving a stop pin. Consequently, the tensioner can be produced at a significantly lower cost. Moreover, the tensioner can be mounted on an engine block more easily, and mounting and demounting of a chain can be carried out more easily. Even in an arrangement where the distance between the housing 32 and the engine block side is so small that removal and insertion of the stop pin would be impossible, the bifurcated part 11 can be removed and inserted easily. Thus, invention provides several significant advantages.

Figure 4:
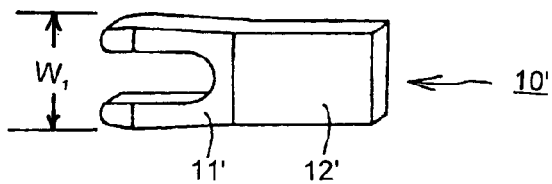
FIG. 4 is a perspective view of a first modification of the plunger stop according to the invention.
Figure 5:
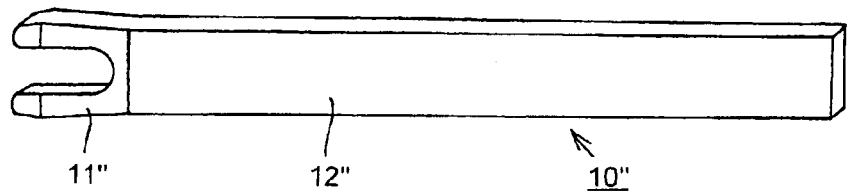
FIG. 5 is a perspective view of a second modification of the plunger stop according to the invention.
Figure 6:
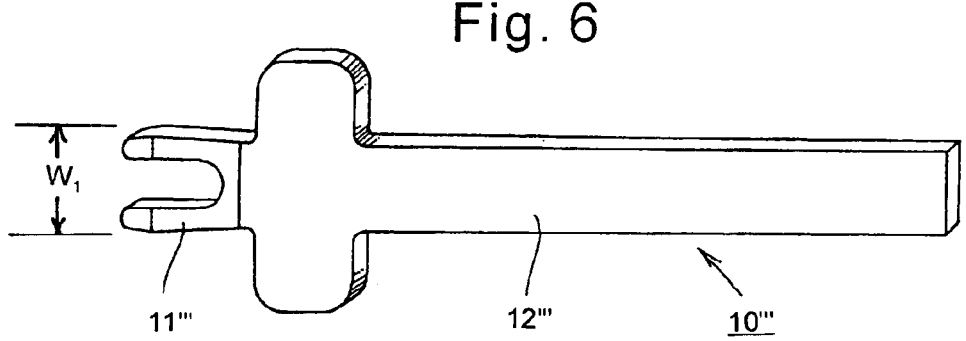
FIG. 6 is a perspective view of a third modification of the plunger stop according to the invention.
Figure 7:
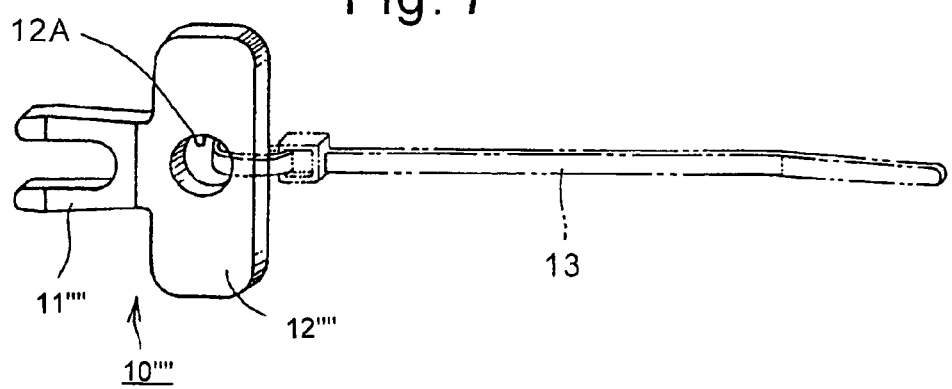
FIG. 7 is a perspective view of a fourth modification of the plunger stop according to the invention.
Figure 8:
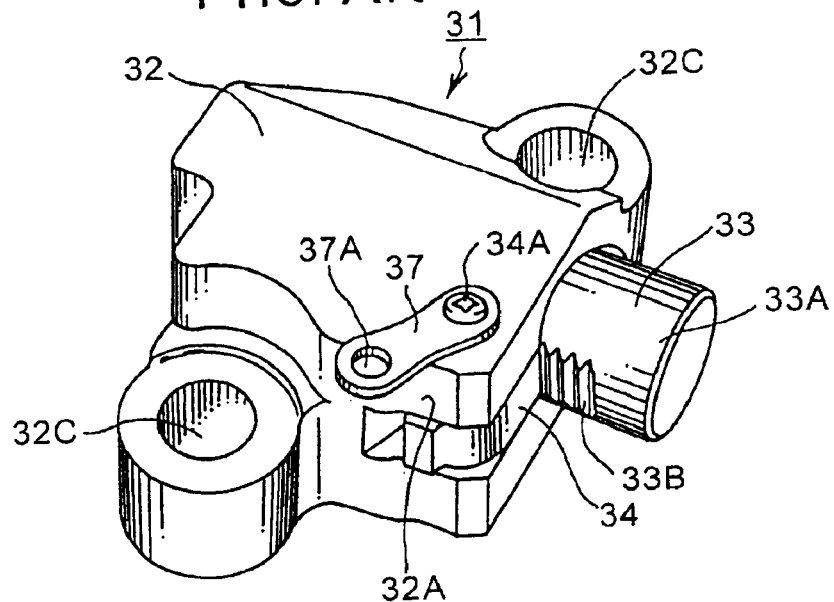
FIG. 8 is a perspective view showing one example of a conventional ratchet type tensioner.
Figure 9:
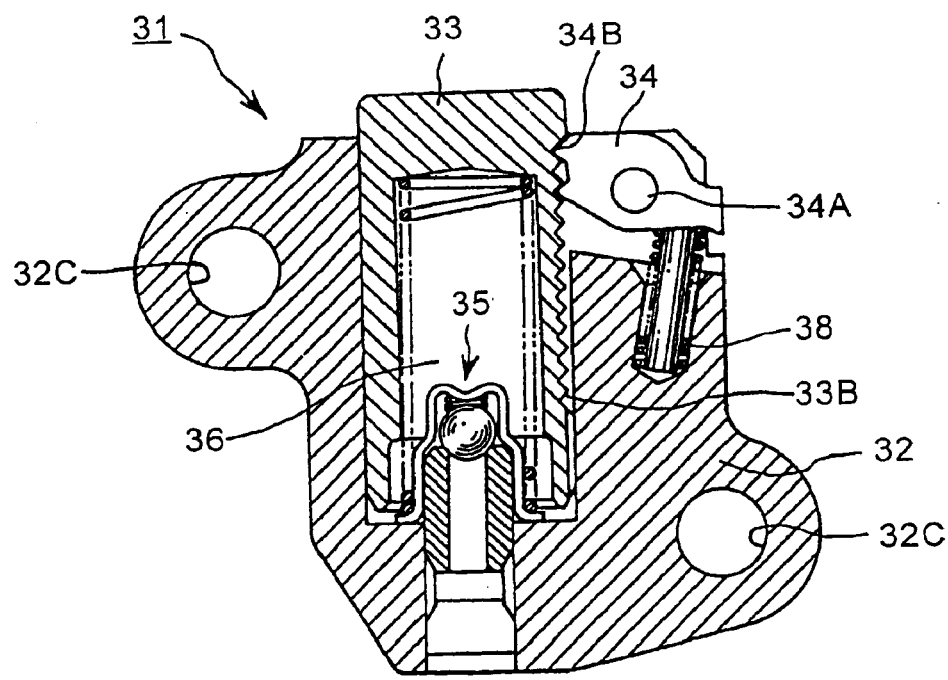
FIG. 9 is a cross-sectional view showing a conventional ratchet type tensioner.
Figure 10:
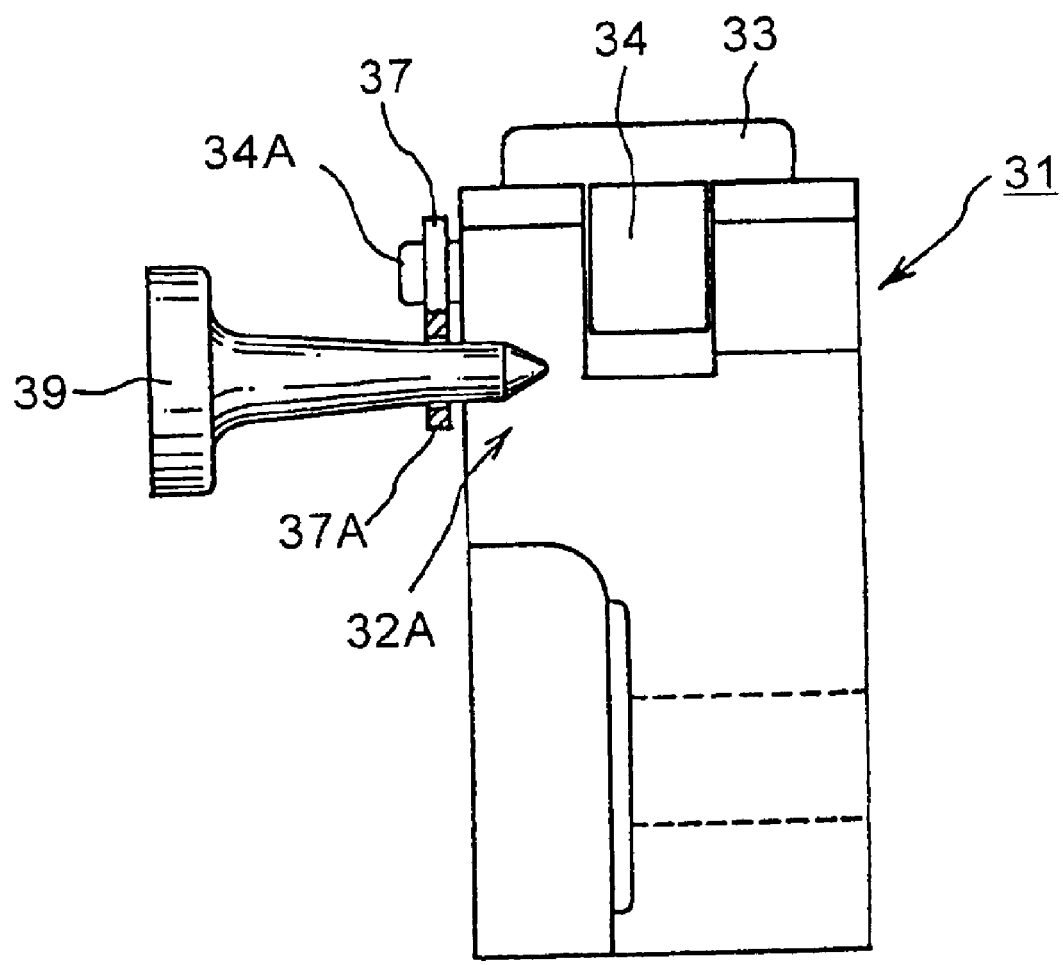
FIG. 10 is an elevational view illustrating the insertion of a stop pin in the tensioner of FIG. 8.
Figure 11:
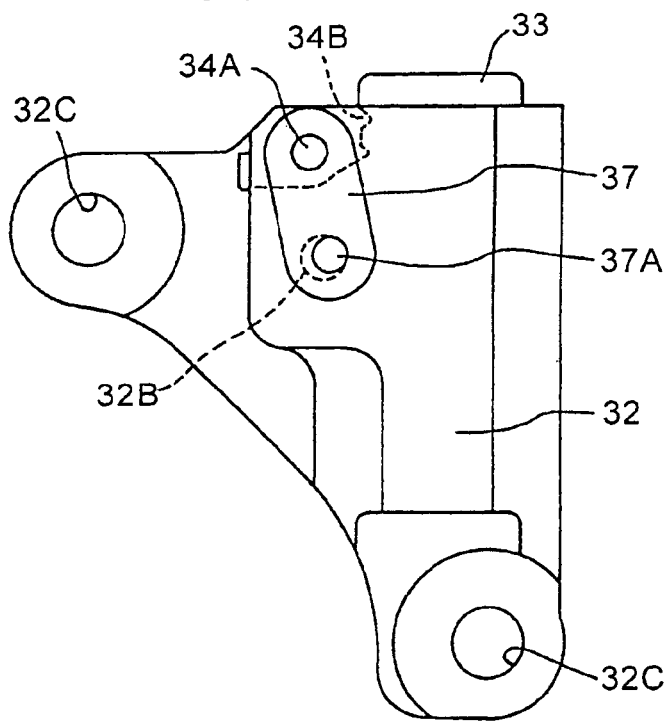
FIG. 11 is a side elevational view showing another example of a conventional ratchet type tensioner.
Figure 12:
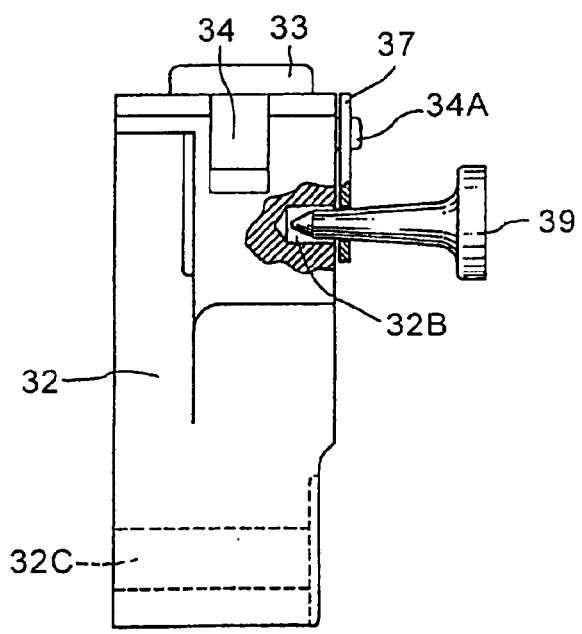
FIG. 12 is an elevational view illustrating the insertion of a stop pin in the tensioner of FIG. 11.

FIGS. 4 to 7 show examples for the plunger stop 10 of the invention. In FIGS. 4–7, parts corresponding to parts of the plunger stop of FIG. 3 are designated by corresponding reference numerals with "prime" markings. FIG. 4 shows a plunger stop in which the width of the grip 12' is reduced so that it is substantially the same as the distance $W_1$ between the outermost sides of the bifurcated part 11'. FIG. 5 shows a plunger stop 10" having an elongated grip 12" in the form of a strip, which facilitates removal of the bifurcated part 11"

from the groove 22A of the housing 22 (FIG. 1). FIG. 6 shows a plunger stop in which the grip 12''' is in the form of an elongated strip having a widened portion adjacent the bifurcated part, wider than the distance $W_1$ between the outermost parts of the bifurcated elements. The elongated strip facilitates removal of the stop from the tensioner housing, and the widened portion facilitates removal of the stop from the tensioner housing, and the widened portion facilitates insertion of the stop into the groove of the tensioner housing. FIG. 7 shows a plunger in which when the grip 12'''' has a widened part as in FIG. 1, but the widened part is provided with a hole 12A for connection to a separate elongated member for facilitating removal of the stop, such as a strap 13, which is shown in broken lines.

In the above-described embodiments, the plunger stops are described as applied to a hydraulic ratchet-type tensioner. These tensioners have some backlash, which is limited by their ratchet pawls. However, the plunger stops 10, 10', etc. can also be applied to non-backing type ratchet tensioners which do not have backlash.

As described above, the bifurcated part of the stop is inserted into a groove in the tensioner housing, and sandwiched between a part of the housing and the ratchet pawl, with the bifurcated part straddling the ratchet pawl spring within the groove. A grip, formed as a unit with the bifurcated part, extends from the bifurcated part and protrudes outside the housing. Accordingly when installed as a temporary plunger stop, the stop prevents pivoting movement of the pawl, and thereby forcibly maintains engagement of the ratchet pawl with the ratchet teeth on the plunger. Therefore, protrusion of the plunger is prevented. To release the stop, the grip is pulled manually to remove the stop from the tensioner housing, so that the plunger is free to move in the protruding direction under the force applied to it by the plunger biasing spring. As explained previously, the stop allows the tensioner to be mounted easily on an engine block, and facilitates the chain mounting and demounting operations.

The plunger stop in accordance with the invention allows the tensioner to be manufactured more easily, since it does not require the step of fixing an external plate to a pawl pivoting shaft, as in the conventional plunger stop structure. Moreover drilling a hole in the tensioner housing to receive a stop pin is not necessary. Consequently the difficulty and cost of production of the tensioner is significantly reduced.

Since the stop in accordance with the invention is inserted into a groove in the tensioner housing, even if the distance between the housing and the engine block is so small that it would interfere with the insertion or removal of a conventional stop pin, the stop of the invention can be removed and inserted easily. Thus the operation of mounting the tensioner on an engine block, and the chain mounting and demounting operations can be performed more easily.

Where the distance between the outermost sides of the bifurcated part of the stop is slightly larger than the width of the groove into which the stop is inserted, even if the spring-biased plunger is pushed back so that the sandwiching force holding the stop between the pawl and the tensioner housing is released, the resilient force exerted on the walls of the grooves by the elements of the bifurcated part of the stop prevents the stop from dropping out of the housing unexpectedly, so that it is removed only when intentionally pulled out of the groove.

We claim:

1. A ratchet tensioner having a housing mountable on an engine block, a plunger protruding from the housing, a first spring biasing the plunger in the protruding direction, ratchet teeth on the plunger, a groove in the housing, a toothed ratchet pawl pivotally disposed in said groove, and a second spring biasing the pawl so that the teeth of the pawl are engaged with the ratchet teeth on the plunger, wherein the improvement comprises a stop having a bifurcated part disposed in said groove, straddling said second spring, and sandwiched between said pawl and a part of said housing, said stop maintaining the teeth of the pawl in engagement with the ratchet teeth of the plunger, and thereby temporarily preventing movement of the plunger in the protruding direction from the housing under the biasing force applied to the plunger by said first spring, said stop having a grip connected to the bifurcated part and extending therefrom to a location outside of the groove for manual removal of the bifurcated part from said groove.

2. A ratchet tensioner as claimed in claim 1, in which said bifurcated part and said grip are unitary.

3. A ratchet tensioner as claimed in claim 1, in which said groove has a pair of opposed walls, in which the bifurcated part of the stop comprised a pair of elements having outer, wall-engaging surfaces, engaged with respective ones of said opposed walls of the groove, and in which the distance between said wall-engaging surfaces of the bifurcated part, when the bifurcated part is removed from the groove, is greater than the distance between said opposed walls, whereby the bifurcated part is held in said groove at least in part by friction resulting from a resilient force exerted by said elements of the bifurcated part against said walls of the groove.

* * * * *